Dec. 30, 1969   W. R. GERCHOW   3,486,779
SECTIONALIZED INDEXING TRANSFER BAR FOR MACHINE TOOLS
Filed Nov. 13, 1967   2 Sheets-Sheet 1
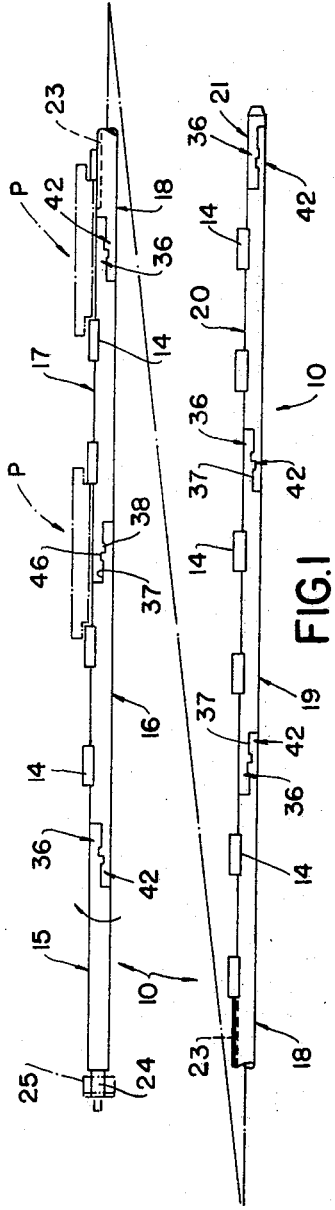
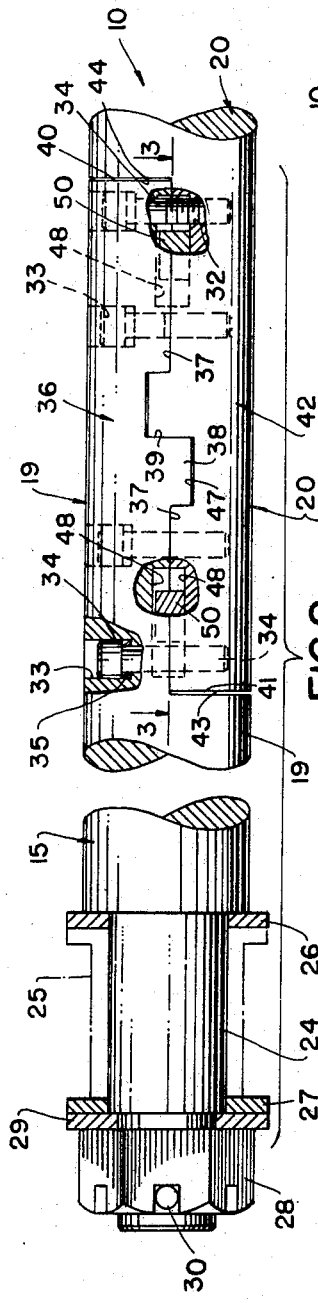
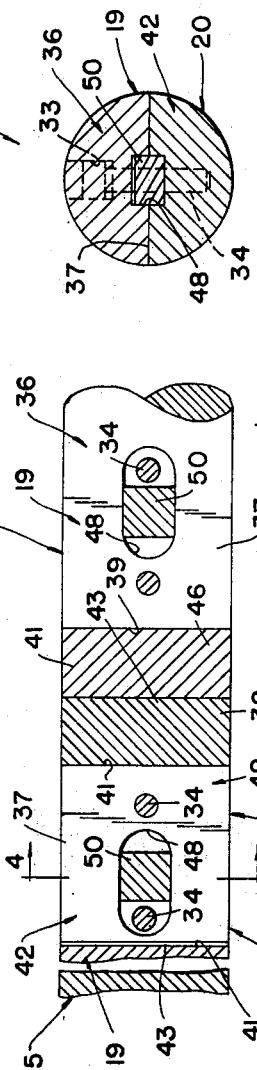
INVENTOR.
WILBUR R. GERCHOW
BY *Whitmore, Hulbert & Belknap*
ATTORNEYS Dec. 30, 1969  W. R. GERCHOW  3,486,779
SECTIONALIZED INDEXING TRANSFER BAR FOR MACHINE TOOLS
Filed Nov. 13, 1967  2 Sheets-Sheet 2
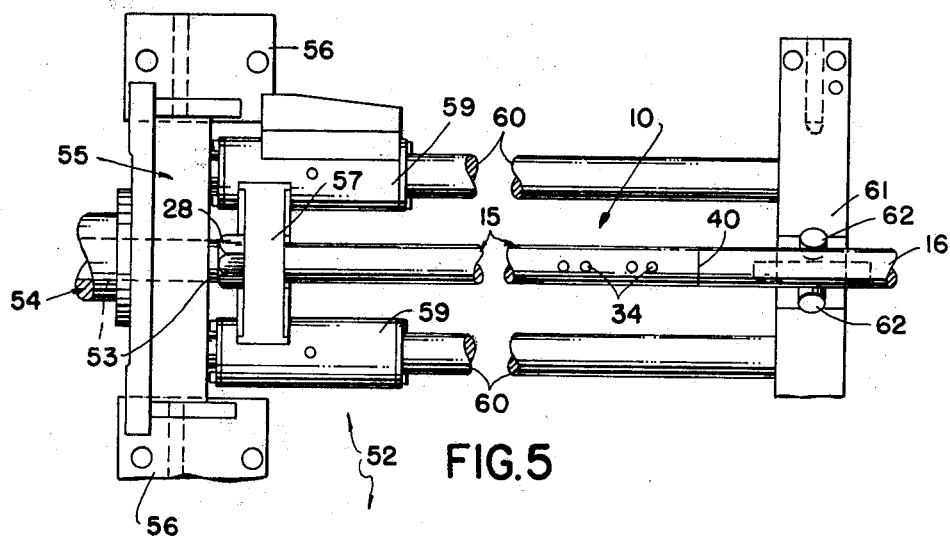
FIG. 5
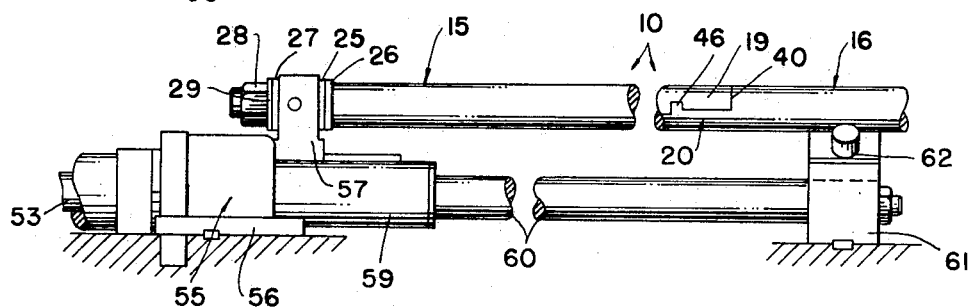
FIG. 6
FIG. 7  FIG. 9
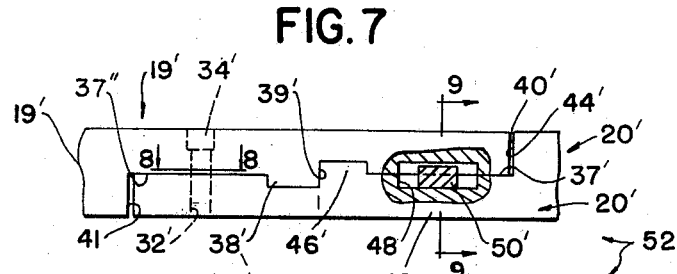 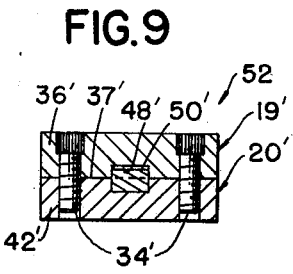
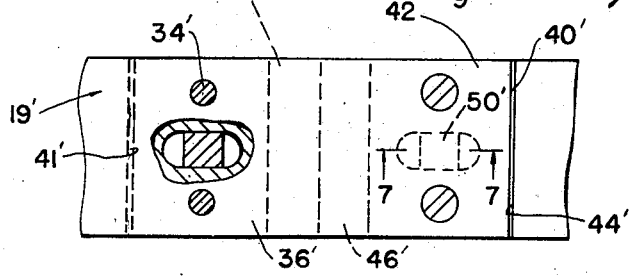
FIG. 8
INVENTOR.
WILBUR R. GERCHOW
BY
ATTORNEYS United States Patent Office 3,486,779
Patented Dec. 30, 1969

3,486,779
SECTIONALIZED INDEXING TRANSFER BAR FOR MACHINE TOOLS
Wilbur R. Gerchow, Ann Arbor, Mich., assignor, by mesne assignments, to Buhr Machine Tool Corporation, a corporation of Delaware
Filed Nov. 13, 1967, Ser. No. 682,394
Int. Cl. F16b 9/00; E04b 1/58
U.S. Cl. 287—103          10 Claims

ABSTRACT OF THE DISCLOSURE

A sectional-type transfer bar for machine tool use is shown, along with a known type of means for imparting straight-line reciprocatory action to the bar for its successive indexing strokes in which it advances load bearing pallets, as along a series of machine tools. The bar is constituted by series of aligned lengths or sections of a generally similar nature insofar as the specific cross-sectional contours thereof are concerned. They include a length having means to operatively connect it to the reciprocatory actuator; a number of intermediate lengths keyed positively to one another for the transmission of the indexing force from the actuator, including a special torque actuator length or section at which force is applied to the bar to move it (as by partial rotation about its axis) for the purpose of moving certain pusher dogs on the bar to disengage them from and re-engage them with the load-bearing pallets which are indexed; and a short end nose.

---

Pursuant to the invention, the intermediate bar lengths, which may be of circular or non-circular cross-section at the body portions thereof, are rigidly united to one another at overlapped end portions of a reduced size cross-section; and the intermediate sections are correspondingly connected rigidly to the respective end sections referred to. The nature of these end connections is such as to tie the bar sections together strongly, and thus constitute the bar as a whole a unitary one. That is, the end connections, in addition to being bolt or screw-united at their overlaps, have further plural interlocks for the positive transmission of the indexing force, independently of the bolt or screw means, and for maintaining the union of the successive lengths or sections when the bar is moved laterally in rotation, or by bodily lateral shift, in disengaging and re-engaging the work-carrying pallets between indexing motions imparted to the latter.

More specifically, the end bar section portions are flatted at a diameter, hence are semi-cylindrical, in a bar of round cross-section. In the case of a bar of non-cylindrical or rectangular cross-section, the thickness of the end portions is half that of the remainder of its associated cross-section.

The end flats are positively interlocked by integral transverse projections from each overlapped flat, each projection matingly received in a corresponding shaped recess of the other flatted portion. This interlock provides for the positive forward drive and rearward retraction of the bar in indexing. The second interlock, which resists lateral relative shift of the bar sections or lengths, between indexings and independently of the bolt or screw holding means, is provided by key means received in recesses of the respective mated bar end flats, such key means spanning the interface of the surfaces of the flats.

BACKGROUND OF THE INVENTION—FIELD

The improved sectionalized indexing bar was devised for typical use in elaborate machine tool transfer equipment, wherein the bar is powered to successively index heavy workpieces mounted on load pallets in a rectilinear path past a series of operating machine tools at one or both sides of the path, by which tools the workpiece may have a number of operations performed thereon, such as facing, boring, reaming, tapping and the like.

Of course, a more general field of application of the principle of the improved bar than in machine tool or other types of part-transfer installations is also contemplated. The installation need not necessarily be a palletized one, in which the bar engages a load or loads to be transferred.

However, in a machine tool transfer installation, the combined weight of the workpiece and its supporting pallet or the transferred load may run as high as 30,000 pounds each, transported in indexing strokes or pitches of, for example, two to five feet in times ranging from 1.5–3.0 seconds. Accordingly, it is seen that, particularly in the forward indexing stroke, inertial forces of great magnitude are involved which may well be applied and removed suddenly, imposing great stresses on the bar.

Not only and necessarily is the present bar capable of standing these stresses, practical production considerations and versatility are served by its longitudinally sectionalized nature; and the bar functions with effectiveness and strength, notwithstanding its multiple-part characteristic. The mutually similar nature of its sectional components contributes to a standardized manufacture of the product. I am not aware of any prior art disclosure of a bar having the functional attributes and of a structural character described above.

THE SUMMARY OF THE INVENTION

The improved bar is composed of a number of intermediate lengths or sections, cylindrical or otherwise, which quite closely resemble one another at overlapped end portions thereof, in fact being substantially identical at these portions other than in respect to the tapping or counterboring thereof at their overlapped flats, mentioned above. The positive nature of the union of bars at their ends is such that the bar as a whole possesses substantially all of the strength and rigidity it would have if it were of one-piece construction. However, its sectionalized nature, as constituted by standardized lengths in a number of component individual lengths contributes versatility to the bar as a whole in respect to the size of load pallets which may be indexed, the longitudinal spacing of the pallets from one another, as dictated by the arrangement of machine tools operating on their respective workpieces, and the like. In short, in little time and with little effort, the improved bar may be in effect constituted a custom-built one for the requirements of any given machine tool set-up.

BRIEF DESCRIPTION OF THE DRAWINGS

FIG. 1 is a broken view illustrating a typical transfer bar according to the invention as constituted by a total of seven end and intermediate lengths or sections, although the number may be greater or less, i.e., more than one;

FIG. 2 is a fragmentary view in side elevation of a portion of an improved bar of cylindrical cross-section, being partially broken away and in longitudinal vertical section to more clearly show the bar interlocking provisions of the invention;

FIG. 3 is a fragmentary view in horizontal cross-section on line 3—3 of FIG. 2;

FIG. 4 is a view in transverse vertical section on line 4—4 of FIG. 3;

FIG. 5 is a fragmentary top plan view, partially broken away, showing the improved bar as mounted to a conventional hydraulically operated mechanism which imparts reciprocatory action to the bar;

FIG. 6 is a fragmentary view in side elevation of the actuator arrangement of FIG. 5;

FIG. 7 is a fragmentary view in side elevation of an alternative embodiment of the bar structure which is of rectangular cross-section, the figure being partially broken away and in transverse vertical section on line 7—7 of FIG. 8;

FIG. 8 is a top plan view of the modified transfer bar of FIG. 7, being partially broken away and in horizontal section on line 8—8 of FIG. 7; and FIG. 9 is a view in transverse vertical section on line 9—9 of FIG. 7.

DESCRIPTION OF PREFERRED EMBODIMENTS

A complete embodiment of the improved bar of the invention, generally designated by the reference numeral 10, is shown in FIG. 1 of the drawings. As indicated by the arcuate arrow in that figure, it is of a type which disengages from and re-engages with the work or work supporting pallets P between indexing strokes by a partial rotary or oscillation motion about its own axis, by which pallet engaging and advancing dogs 14 on certain intermediate lengths or sections of bar 10 are dropped below the bottom level of the work or pallets P for rearward retraction, i.e., to the left in FIG. 1, then are returned rotatively to the operating level behind a following pallet. However, it is contemplated that this necessary action of the pallet indexing dogs 14 may be had by a bodily shift of bar 10 laterally, rather than rotatively; both types of action are well known.

Typically and solely for the purpose of illustration, the improved bar 10 may comprise a total of seven end and intermediate sections having in common certain cross-sectional characteristics at overlapped termini thereof, as will be described. Thus, the illustrated bar is seen to be made up of a first or inner end length or section 15, at which the bar is drivingly connected to a conventional hydraulic actuator, in the manner shown in FIGS. 5 and 6; five successive intermediate sections very similar in nature to one another, including what may be termed (to distinguish them in a secondary respect) a first, tapped intermediate section 16, a second, counterbored intermediate section 17, a third, special section 18 at which rotative torque is applied to bar 10 through the agency of conventional means (not shown) for the pallet disengaging and re-engaging action, a fourth, counterbored section 19, and a fifth, tapped section 20; and an outer end section 21.

The actuator torque section 18, like intermediate tapped sections 16 and 20, has tapped means of a sort to be described for receiving securing bolts or screws. Section 18 determines the order in succession of the balance of the counterbored and tapped intermediate sections 16, 17, 19 and 20; and it has means to receive the rotative dog clearing and return motion referred to above. Such means may, for example, include a longitudinally extending keyway 23 on section 18.

As for the inner and outer end sections 15 and 21, they should not exceed in length that of the intermediate sections, and end section 21 may be very short, inasmuch as it is, in effect, simply a nose piece.

As illustrated in FIG. 2, the inner end length or section 15 of bar 10 has a cylindrical rearward portion 24 of reduced diameter adapted to receive a bushing 25 between spacer and thrust rings 26, 27 encircling the portion 24. The latter is threaded at its end to receive a lock nut 28 acting against a steel thrust washer 29, the nut being itself locked in place by a transverse roll pin 30.

FIG. 2 also shows all of the provisions required for overlappingly interlocking the counterbored intermediate bar section 19 with the adjacent, tapped section 20; and it is to be understood that corresponding connections unite end section 15 to the first intermediate section 16, the latter to the second intermediate section 17, the latter to the special intermediate actuator section 18, the section 18 to the fourth intermediate section 19, the latter to the last intermediate section 20, and that section to end section 21. It should be pointed out that the sections 16, 18 and 20, designated as being tapped, differ from the sections 17 and 19 (other than in respect to the drive keyway 23 of section 18 and possible differences in length) only in that they have pairs of tapped bolt or screw-receiving holes 32, as appears at the right of FIG. 2, whereas the intermediate sections 17, 19 have pairs of counterbored holes 33 to receive the heads of screws 34 and a lock washer 35 for each. The holes 32 and 33 are placed adjacent certain recessed zones of the overlapped bar ends, as will be described.

Attention being paid in particular to FIGS. 2, 3 and 4, it is seen that the illustrated counterbored intermediate section 19 (and this is true of all other counterbored sections), has an end portion 36 of generally semi-cylindrical cross-section, bottomed by a flat, diametral surface 37, which surface is interrupted only by an integral transverse projection 38 across its width and a recess 39 of corresponding axial extent. The generally flattened area extends to the left in FIG. 2 from an end 40 to a shoulder at 41 where the full cylindrical cross-section of bar length 19 resumes.

Similarly, the overlappingly mated bar section 20 has at each of its ends an end portion 42 which is in all respects, save for the tapped holes 32, an oppositely oriented duplicate of the end portion 36 of bar section 19, the portion 42 extending from an end 43 thereof to a semi-cylindrical shoulder at 44, where the full cylindrical cross-section of bar length 20 resumes.

The transverse projection of end portion 42 is designated 46, being of an axial extent to mate quite snugly into the recess 39 of bar section 19; and the recess in portion 42 which receives the projection 38 is designated 47. All of these formations 38, 39, 46 and 47 are of substantially equal axial dimension.

Accordingly, it is seen that the interlock of end portions 36 and 42 on opposite sides of a diametral interface represented by the generally flat surface 37 is one capable of transmitting the extremely heavy forces and withstanding the heavy inertial effects mentioned above, constituting the sectional bar 10 as a whole the full equivalent in point of rigidity and strength of a one-piece bar. The interlock is supplemented in respect to transverse rigidity in the plane of the interface 37 by further means now to be described.

For this purpose, the end bar portions 36 and 42 are each provided, in axially outwardly spaced relation on opposite sides of their mating interlock projections 38 and 47, with keyway-type recesses 48. These recesses are of equal radial depth in the bar portions, each extending but part way radially from the surface 37 through the thickness of the stock. They are of oblong and rounded-end shape and are in transverse register with one another on the opposed bar portions 36 and 42, thus providing a pair of axially aligned, closed end and closed bottomed cavities in the latter. Each of these cavities houses a small, block-like steel key member 50 which is of rectangular or square shape in horizontal cross-section. It is of a transverse width such as to be snugly received at its sides in the registering recesses 48; and its depth transversely spans (FIGS. 2 and 4) the interface at 37 of the portions 36, 42 of bar sections 19 and 20 respectively.

It need not be coextensive in height with the combined height of recesses 48, thereby insuring a tight contact of the interface surfaces when the bolts 34 are tightly taken up at the tapped holes 32. As appears in FIG. 2, one pair of the bolts 34 extends through the registered recesses 48, while the other pair does not.

Thus the tension and compression interlock of the overlappingly mated sections, as supplemented by bolts or screws 34, is coupled with an interlock by key blocks 50 against stresses tending to cause lateral shift of the bar sections relative to one another, as might otherwise occur when the bar 10 is rotated or transversely shifted bodily between indexing actions.

The modified embodiment of the improved bar, shown in FIGS. 7, 8 and 9 and generally designated by the reference numeral 52, differs only from the embodiment 10 in that its bar sections, including the axially overlapped and interlocked end portions, are of rectangular cross-section, rather than cylindrical. Accordingly, structural features and relationships shown in FIGS. 7, 8 and 9 which correspond to features and relationships appearing in FIGS. 2, 3 and 4 are designated by corresponding reference numerals, primed, and further description in detail is dispensed with. It may be noted, however, that the bolts 34' are located on transversely opposite sides of the recesses 48', rather than in axial alignment with the latter, inasmuch as the full rectangular cross-section of bar 52 affords necessary material for the purpose. This in turn results in an axially shorter overall length of the bar sections, should this be a consideration of significance.

FIGS. 5 and 6 illustrate the improved sectionalized transfer bar, in its cylindrical-section embodiment 10, as powered for indexing strokes by a conventional type hydraulic cylinder actuator and bar guide unit, generally designated by the reference numeral 52. The plunger rod 53 of an appropriate hydraulic cylinder mechanism 54 is slidably guided in a cross head 55 supported by appropriate base plates 56 on a suitable horizontal surface; and plunger rod 53 is fixedly connected to a yoke 57, in which the bushing 25, as applied to bar 10 in the manner shown in FIG. 2, is clamped.

Yoke 25 is supported by a pair of transversely spaced guide sleeves 59, which sleeves are longitudinally slidable upon a pair of elongated guide rods 60. These are rigidly mounted appropriately at their left-hand end (FIGS. 5 and 6), for example to a part of cross head 55; and at their right-hand end guide rods 60 are similarly mounted rigidly to a transversely extending, cradle-type guide device 61. The latter carries a pair of upwardly divergent bearing rollers or spools 62, between and upon which the transfer bar 10 rests and is sustained and guided. If the length of the bar requires it, further similar guide and bearing means may be provided along the bar length for needed stability.

The sectionalizing of the improved bars 10 and 52 enables various lengths thereof to be manufactured and stocked in a machine tool plant or shop, being assembled as required for any given set-up of machine tool heads or stations. Bars of different lengths may be fitted together as needed. The intermediate bars 16–20 may be of greater length than that of a single transfer throw or pitch, but should not exceed eighty inches in individual overall length. For example, the usual pitch distance or throw of the pallets 14 may be as little as twenty-four inches, ranging up to sixty or seventy-two inches. Accordingly, the bar sections 16–20 will each be measured in total length in aliquot increments of six inches, and assembled endwise in lengths corresponding to the possibly different longitudinal distances between machining stations. Similar considerations may well be involved in the application of the principles of the invention to uses other than in a machine tool installation.

What is claimed is:

1. A transfer bar comprising a plurality of longitudinally aligned bar lengths having an overlapped and interlocked connection to one another at adjacent ends thereof which affords a positive transmission of force between said bar lengths in either direction along the length of the bar, said respective ends having generally flat meeting surfaces at which the end overlap is made, and means rigidly connecting said lengths together at said surfaces, said connecting means including means extending transverse of the interface of said surfaces to interlock the bar lengths in the longitudinal direction, said ends having transversely aligned keyway recesses extending only partially from said meeting surfaces through the thickness of the bar length, and a key element separate from both bar lengths received in said keyway recesses and transversely spanning said surface interface to afford a lateral interlock of the bar lengths.

2. A transfer bar comprising a plurality of longitudinally aligned bar lengths having an overlapped and interlocked connection to one another at adjacent ends thereof which affords a positive transmission of force between said bar lengths in either direction along the length of the bar, said respective ends having generally flat meeting surfaces at which the end overlap is made, the respective surfaces being further formed with mating transverse projections and recesses providing one interlock for said transmission of force, and means rigidly connecting said lengths together at said surfaces, said connecting means including key-type means transversely spanning the interface of said surfaces to afford a second interlock of the bar lengths, said ends having transversely aligned keyway recesses extending only partially from said meeting surfaces through the thickness of the bar length, said key-type means comprising a key element separate from both bar lengths received in said keyway recesses and transversely spanning said surface interface.

3. The transfer bar of claim 1, in which said last named means comprises an integral transverse projection from the flat surface of one bar end matingly received in a recess in the overlapped end of an adjacent bar length.

4. The transfer bar of claim 2, in which said bar lengths are approximately semi-circular in cross-section at said overlapped ends.

5. The transfer bar of claim 2, in which said bar lengths are approxiamtely rectilinear in cross-section of said overlapped ends.

6. The transfer bar of claim 1, in which said keyway recesses are elongated in the direction of the length of said bar, said key element being less elongated in that direction and fitting snugly between the side walls of the elongated recesses.

7. The transfer bar of claim 2, in which said keyway recesses are elongated in the direction of the length of said bar, said key element being less elongated in that direction and fitting snugly between the side walls of the elongated recesses.

8. The transfer bar of claim 1, and further comprising threaded means holding said overlapped ends from separation from one another at 90° to said interface.

9. The transfer bar of claim 2, in which said bar lengths and overlapped ends thereof are rectangular in cross-section.

10. A transfer bar comprising a plurality of longitudinally aligned bar lengths having an overlapped and interlocked connection to one another at adjacent ends thereof which affords a positive transmission of force between said bar lengths in either direction along the length of the bar, said respective ends having generally flat meeting surfaces at which the end overlap is made, the respective surfaces being further formed with mating transverse projections and recesses providing one interlock for said transmission of force, and means rigidly connecting said lengths together at said surfaces, said connecting means including key-type means transversely spanning the interface of said surfaces to afford a second interlock of the bar lengths, and threaded means holding said overlapped ends from separation from one another at 90° to said interface.

References Cited

UNITED STATES PATENTS

| | | |
|---|---|---|
| 573,281 | 12/1896 | Morris. |
| 1,514,652 | 11/1924 | Burmaster _____ 287—103 |
| 2,242,078 | 5/1941 | Kimball _____ 287—104 |
| 2,788,234 | 4/1957 | Doyle _____ 287—103 |

FOREIGN PATENTS

| | | |
|---|---|---|
| 365,077 | 1/1932 | Great Britain. |
| 729,520 | 12/1942 | Germany. |

DAVID J. WILLIAMOWSKY, Primary Examiner

A. V. KUNDRAT, Assistant Examiner

U.S. Cl. X.R.

287—20.92